(12) United States Patent
Van Den Briel

(10) Patent No.: US 10,069,299 B2
(45) Date of Patent: Sep. 4, 2018

(54) CONTROLLING OPERATION OF POWER CONSUMING DEVICES IN AN ELECTRICAL GRID

(71) Applicant: NATIONAL ICT AUSTRALIA LIMITED, Eveleigh, NSW (AU)

(72) Inventor: Menkes Van Den Briel, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 262 days.

(21) Appl. No.: 14/762,121

(22) PCT Filed: Jan. 29, 2014

(86) PCT No.: PCT/AU2014/000054
§ 371 (c)(1),
(2) Date: Jul. 20, 2015

(87) PCT Pub. No.: WO2014/117212
PCT Pub. Date: Aug. 7, 2014

(65) Prior Publication Data
US 2015/0357817 A1    Dec. 10, 2015

(30) Foreign Application Priority Data
Jan. 30, 2013  (AU) .................................. 2013900285

(51) Int. Cl.
*H02J 3/12* (2006.01)
*G06F 17/18* (2006.01)
(Continued)

(52) U.S. Cl.
CPC ................. *H02J 3/12* (2013.01); *G05B 15/02* (2013.01); *G06F 17/18* (2013.01); *G06Q 10/04* (2013.01);
(Continued)

(58) Field of Classification Search
CPC .......... H02J 3/12; H02J 2003/003; H02J 3/14; G05B 15/02; G06F 17/18; G06Q 10/04;
(Continued)

(56) References Cited

U.S. PATENT DOCUMENTS 4,511,979 A    4/1985  Amirante
2012/0150359 A1  6/2012  Westergaard

OTHER PUBLICATIONS

Arslan, Can, "Household Electricity Cost Reduction", Aug. 24, 2012, University of Twente.*
(Continued)

*Primary Examiner* — Carlos Ortiz Rodriguez

(57) ABSTRACT

The present invention generally relates to load control in an electrical grid (110). Operation of a power consuming device (125) in the electrical grid (110) is controlled. An ideal shiftable load of the electrical grid (110) is received or accessed. A probability distribution of starting time of the power consuming device (125) is determined based on the ideal shiftable load of the electrical grid (110). Then a starting time for the operation of the power consuming device (125) is determined in accordance with the probability distribution of starting time. An instruction is then sent to cause the power consuming device (125) to be started at the starting time.

14 Claims, 4 Drawing Sheets

(51) Int. Cl.
  *G05B 15/02*   (2006.01)
  *H02J 3/14*   (2006.01)
  *G06Q 10/04*   (2012.01)
  *H02J 3/00*   (2006.01)
  *G06Q 50/06*   (2012.01)
(52) U.S. Cl.
  CPC ............... *H02J 3/14* (2013.01); *G06Q 50/06* (2013.01); *H02J 2003/003* (2013.01); *Y02B 70/3225* (2013.01); *Y02B 90/244* (2013.01); *Y04S 10/54* (2013.01); *Y04S 20/222* (2013.01); *Y04S 20/327* (2013.01)
(58) Field of Classification Search
  CPC ....... G06Q 50/06; Y04S 20/327; Y04S 10/54; Y04S 20/222; Y02B 70/3225; Y02B 90/244
  See application file for complete search history.

(56) References Cited

OTHER PUBLICATIONS

A.J. Roscoe, "Supporting high penetrations of renewable generation via implementation of real-time electricity pricing and demand response", IET Renew. Power Gener. 2010 vol. 4, Issue 4, pp. 369-382.
Shinwari, M. et al, "A Water-Filling Based Scheduling Algorithm for the Smart Grid", IEEE Transactions on Smart Grid, vol. 3, No. 2, Jun. 2012, pp. 710-719.
PCT International Search Report and Written Opinion, PCT/AU2014/000051, Australian Patent Office, dated Mar. 2014, 9 pages.

* cited by examiner

CONTROLLING OPERATION OF POWER CONSUMING DEVICES IN AN ELECTRICAL GRID

CROSS-REFERENCE TO RELATED APPLICATIONS

The present application claims priority from the Australian provisional application 2013900285 filed on 30 Jan. 2013 with National ICT Australia being the applicant and the contents of which are incorporated herein by reference.

TECHNICAL FIELD

The present invention generally relates to load control in smart grid. Aspects of the invention include computer-implemented methods, software and computer systems for controlling operation of power consuming devices.

BACKGROUND

In a traditional electrical grid, the electrical grid rarely interacts with the power consuming devices it serves. In other words, the electrical grid normally does not know when a power consuming device is going to start and how much electricity the power consuming device is going to consume, nor does the power consuming device have any idea of how much power the electrical grid can supply. As a result, if many power consuming devices start to operate at the same time, the aggregate load of the electrical grid is likely to go beyond the operation capacity of the electrical grid, which may result in higher operation cost or even failure of the electrical grid. In a modern electrical grid, specifically, a smart grid, information about the power consuming devices and the electrical grid are directly or indirectly exchanged therebetween to schedule operation of the power consuming devices in order to keep the aggregate load of the electrical grid at an optimised level, such that the electrical grid and/or the power consuming devices can operate under an optimised condition.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

There is provided a computer-implemented method for controlling operation of a power consuming device in an electrical grid, the method comprising:
  determining a probability distribution of starting time of the power consuming device based on an ideal shiftable load of the electrical grid;
  determining a starting time for the operation of the power consuming device in accordance with the probability distribution of starting time; and
  sending an instruction to cause the power consuming device to be started at the starting time.

It is an advantage that the present invention determines the probability distribution of starting time and a starting time based on the probability distribution to indirectly control operation of the power consuming device in a random way. By doing this, the overall load of the electrical grid is substantially kept at the ideal load of the electrical grid such that the electrical grid operates with optimised operation conditions.

The electrical grid may comprise a smart grid.

The power consuming devices may comprise devices that can be programmed to operate within a certain time window, such as washing machines, dryers, dishwashers, electric vehicles, etc.

The ideal shiftable load may be based on an ideal load and a non-shiftable load of the electrical grid.

The ideal shiftable load may be for example the ideal load minus the non-shiftable load.

The ideal load may represent energy that the operator of the electrical grid can supply in a certain time period using the electrical grid meanwhile keeping the electrical grid with optimised operation conditions, for example, minimised operating cost. It should be noted that the ideal load of the electrical grid may be variable depending on the configuration of the electrical grid.

The non-shiftable load may be a substantially predetermined and/or predictable energy that the operator of the electrical grid supplies in a certain time period. Supply of the non-shiftable load cannot be shifted into another time period.

A shiftable load may represent energy that can be shifted from a time period into another, which means supply of the shiftable load can be shifted into another time period in a time window.

The ideal shiftable load may represent energy that the operator of the electrical grid can shift into a certain time period to keep the electrical grid operating at the ideal load level in the certain time period given the substantially predetermined and/or predicable non-shiftable load.

Determining the probability distribution of starting time of the power consuming device may be based on a time window for the operation of the power consuming device. Further, determining the probability distribution of starting time of the power consuming device may further comprise determining the probability distribution based on an energy consumption profile and a time window for the operation of the power consuming device.

The energy consumption profile and the time window for the operation of the power consuming device may be included in an operation request.

Sending the instruction to cause the power consuming device to be started may comprise sending, at the starting time, the instruction to start the power consuming device. The power consuming device may be started upon receipt of the instruction.

Sending the instruction to cause the power consuming device to be started may comprise sending, before the starting time, the instruction to an intermediary smart meter or an Energy Management System in the electric grid, wherein the instruction includes the starting time.

The power consuming device may be started by the smart meter when the starting time arrives.

The method may initially comprise receiving or accessing an ideal shiftable load of the electrical grid.

There is also provided a computer software program, including machine-readable instructions, when executed by a processor, causes the processor to perform the method of any one of the preceding claims.

There is further provided a computer system for controlling operation of a power consuming device in an electrical grid, the system comprising a processor that is adapted to:

determine a probability distribution of starting time of the power consuming device based on an ideal shiftable load of the electrical grid;

determine a starting time for the operation of the power consuming device in accordance with the probability distribution of starting time; and send an instruction to cause the power consuming device to be started at the starting time.

BRIEF DESCRIPTION OF THE DRAWINGS

At least one example of the invention will be described with reference to the accompanying drawings, in which.

It should be noted that the same numeral represents the same or similar elements throughout the drawings.

BEST MODES OF THE INVENTION

Electrical Grid

Figure 1:
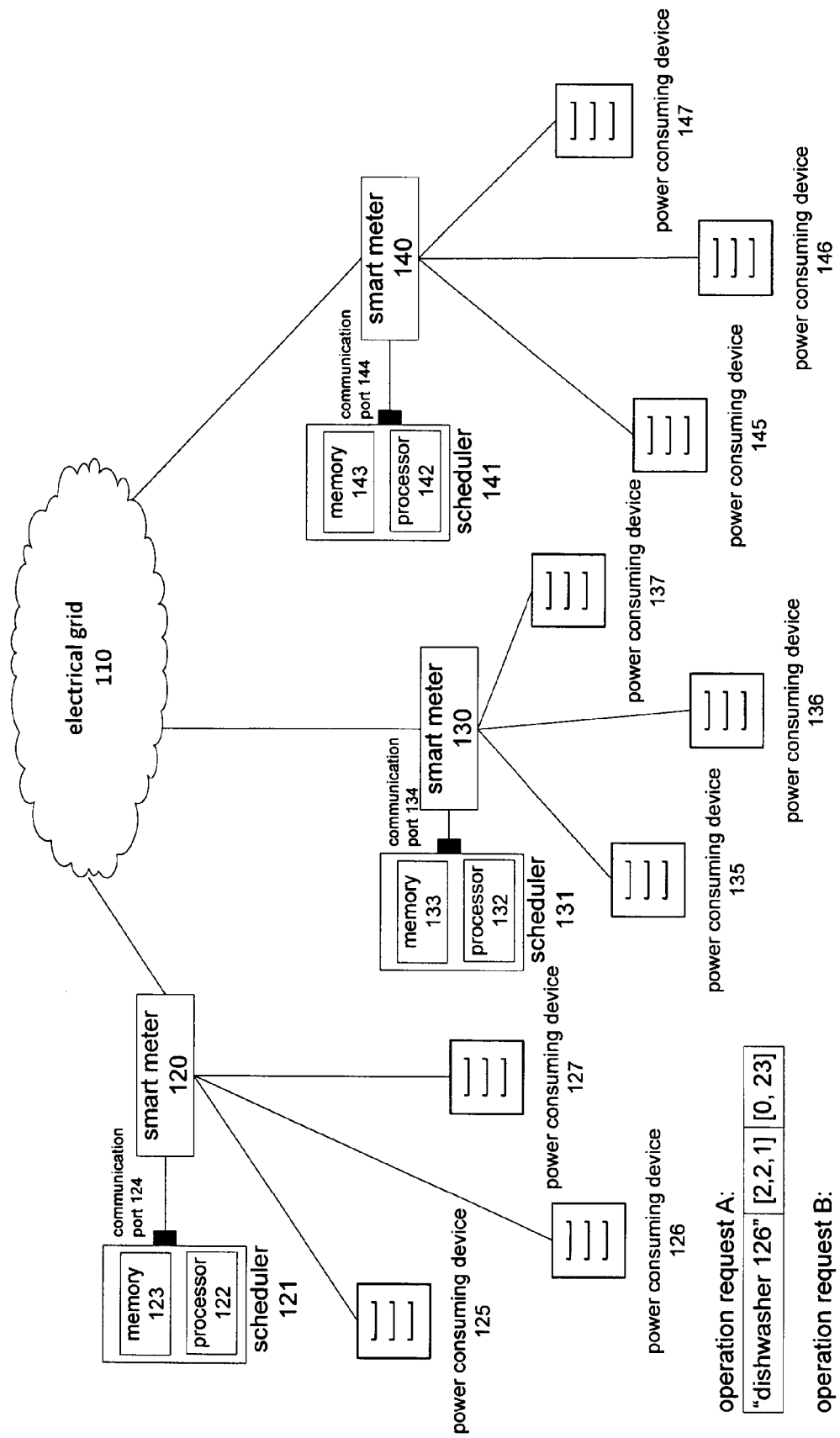
FIG. 1 is a diagram of an electrical grid having schedulers used to schedule operation of power consuming devices according to an embodiment of the present invention.

In FIG. 1, an electrical grid 110 is a power supply network that supplies electric energy to power consuming devices 125, 126, 127, 135, 136, 137, 145, 146 and 147 in the electrical grid 110. In the present invention, the electrical grid 110 may be a smart grid that can directly or indirectly provide its status information such as operation capacity, pricing policy, etc. to smart meters 120, 130 and 140 connected thereto.

Figure 2A:
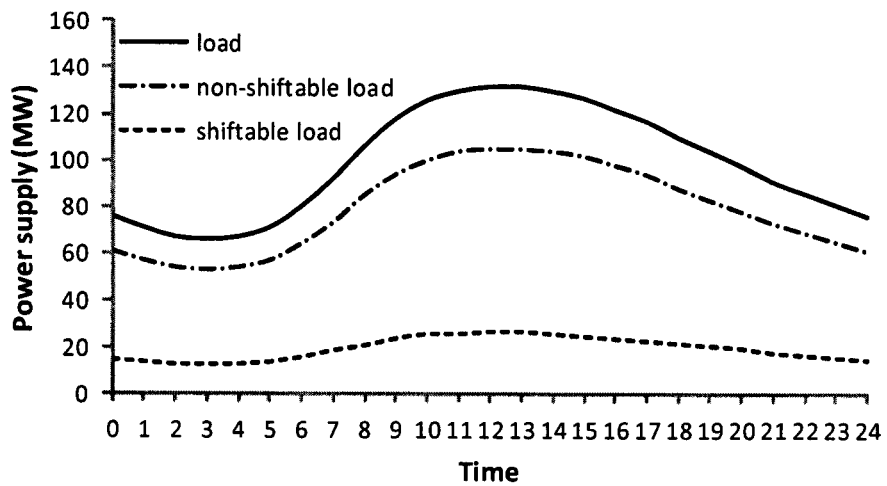
FIG. 2a shows a break-down of aggregate load of an electrical grid.

To describe the concept of the invention, it is necessary to clarify terminology used in the present specification. With reference to FIG. 2, the horizontal coordinates represent a time of day, and the vertical coordinates represent the energy that the electrical grid 110 supplies at a time of day. The aggregate energy that the electrical grid 110 supplies at a certain time of day is referred to as load (shown as the solid line in FIG. 2a). The load can be divided into non-shiftable load (shown as dot-dash line in FIG. 2a) and shiftable load (dash line in FIG. 2a).

The non-shiftable load may be substantially predetermined and/or predictable energy that the electrical grid 110 supplies in a certain time period. For example, the energy used for lights and home entertainment has to be supplied in a certain time period such as 8:00 pm-11:00 pm everyday. In other words, the supply of the non-shiftable load cannot be scheduled into another time period.

The shiftable load represents energy that can be shifted from a time period into another, which means the supply of the shiftable load can be scheduled into another time period in a time window. For example, a user decides to wash his clothes at 8:00 am in the morning just before leaving for work. He wants this washing completed by 5:30 pm when he expects to return home. The user programs the washing machine to run the long hot wash cycle to be start any time from now provided it is completed by 5:30 pm, so the time window is 8:30 am to 5:30 pm. If the long hot wash cycle takes 2 hours and 15 minutes then the washing machine may start as early as 8:00 am or as late as 3:15 pm in order to finish by 5:30 pm. The user is indifferent about when the washing machine starts running as long as it is finished by 5:30 pm. Therefore, the supply of the shiftable load for this task can be scheduled into any time period between 8:00 am and 3:15 pm of that day. In other examples the time window for the operation of the power consuming device may be a window that includes all the suitable start times, but not necessarily the end time for the operation of the power consuming device. Using the example above the time window in that case would be 8:00 am and 3:15 pm.

It can be seen from the above description that the load of the electrical grid 110 is the sum of the non-shiftable load and the shiftable load. The load of the electrical grid 110 may exceed its operation capacity, the maximum load that the electrical grid 110 can supply, during peak times such as on summer nights when thousands or even millions of users operate their TV sets, air conditioners, etc. at the same time. This exceeding of operation capacity may cause starting of spare modules of the electrical grid 110 to supply additional energy in order to guarantee energy supply, or may even result in failure of the electrical grid 110 causing a supply interruption. Both scenarios may bring economic inefficiency to the operator and the users of the electrical grid 110.

Figure 2B:
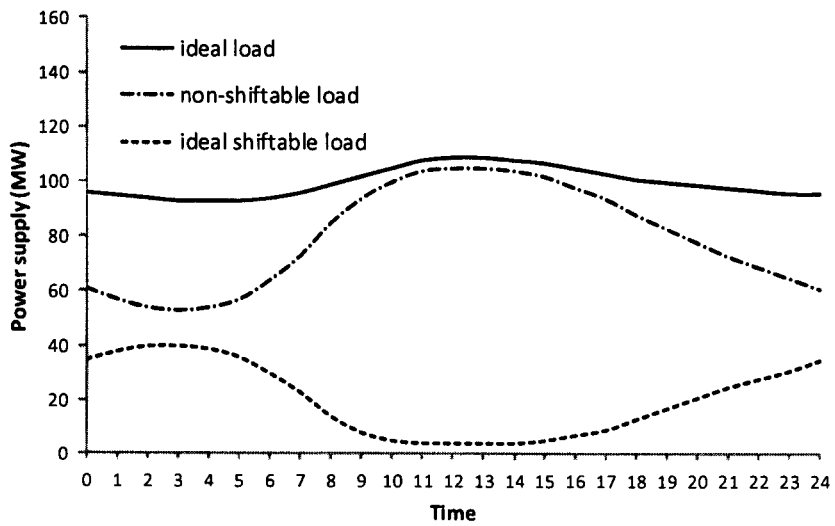
FIGS. 2b shows a break-down of ideal load of the electrical grid according to embodiments of the present invention.

In practice, the electrical grid 110 may have its ideal load, which represents energy that the operator of the electrical grid 110 can supply in a certain time period using the electrical grid 110 meanwhile keeping the electrical grid under an optimised operation condition, for example, minimised operating cost. An example of the ideal load is shown in FIG. 2b as the solid line and in this example is fairly constant over the time. It should be noted that in another example, the ideal load may not be constant over the time. In other words, the ideal load of the electrical grid 110 is variable. The ideal load is comprised of the non-shiftable load, which has the same meaning as that in FIG. 2a, and ideal shiftable load. The ideal shiftable load, shown as the dash line in FIG. 2b, represents energy that the operator of the electrical grid can shift within a time window to a certain time period to keep the electrical grid operating at the ideal load level in the certain time period and over the time window overall given the substantially predetermined and/or predicable non-shiftable load. In the present invention, the ideal load is the sum of the non-shiftable load and the ideal shiftable load. For example, in FIG. 2b, the ideal load at 4:00 am is around 100 MW, non-shiftable load is around 60 MW, then the ideal shiftable load is around 40 MW.

The present invention is to keep the shiftable load substantially at the level of the ideal shiftable load to make the electrical grid 110 operate within the optimised operation condition.

Smart Meter

In FIG. 1, the smart meters 120, 130 and 140 function as intermediary entities between the electrical grid 110 and the power consuming devices 125, 126, 127, 135, 136, 137, 145, 146 and 147, which receives the status information from the electrical grid 110 and operation requests from the power consuming devices 125, 126, 127, 135, 136, 137, 145, 146 and 147. The status information of the electrical grid 110 and the operation requests are then sent to or accessed by the smart meters 120, 130 and 140. One of the tasks of the smart meters 120, 130 and 140 is to cause the power consuming devices under their respective management to start in a certain time window if they are programmed to operate in the certain time window. For example, as shown in FIG. 1, the power consuming devices 125, 126 and 127 are grouped together to be managed by the smart meter 120. If any one of the power consuming devices 125, 126 and 127 is programmed to operate in a certain time window, an operation request is sent to the smart meter 120. Unlike traditional smart meters, the smart meter 120 in this embodiment of the present invention does not determine a starting time to start the power consuming devices; instead, the smart meter 120 causes the requesting power consuming device 125 to start upon receipt of a start instruction from a scheduler 121. As explained below, in this embodiment, the start instruction is sent from the scheduler 121 to the smart meter 120 at the starting time determined in a randomised way in accordance with a probability distribution of starting time. The probability distribution of starting time is determined based on the status information and the operation request received or accessed from the smart meter 120.

In another embodiment, a start instruction including the starting time may be sent to the smart meter 120 once the starting time is determined by the scheduler 121 in accordance with the probability distribution of starting time, in other words, before the starting time, and the smart meter 120 in turn causes the power consuming device 125 to start when the starting time arrives.

In a further embodiment, the smart meter 120 may simply forward the start instruction including the starting time to the power consuming device 125 upon receipt of the start instruction from the scheduler 121, and the power consuming device 125 may automatically starts when the starting time arrives.

It should be noted that although a smart meter is described and adopted in the embodiment of the present invention as the intermediary entity between the electrical grid and the power consuming devices under its respective management, in practice, an energy management system (EMS) (not shown in FIG. 1) may also be used as the intermediary entity to perform the similar functions without departing from the scope of the invention as broadly described.

Scheduler

Each of the schedulers 121, 131 and 141 is connected to the smart meters 120, 130 and 140, respectively, as a computing device or part of a computing device that receives or accesses data from the smart meter connected thereto to determine the probability distribution of the starting time of the requesting power consuming device and in turn the actual starting time based on the probability distribution. In other embodiments, a scheduler may be in communication with only one power consuming device. In that case, the scheduler may be part of the power consuming device, such as inside the housing of the power consuming device so that the functionality of the scheduler is a function (i.e. part of) of the power consuming device.

As mentioned above, the energy management systems (EMS) may be used to replace the smart meters 120, 130 and 140. In this case, each of the schedulers 121, 131 and 141 is connected to their corresponding EMS.

Although each of the schedulers 121, 131 and 141 is shown as an independent entity in FIG. 1, the scheduler can also be part of the smart meter connected thereto. Take the scheduler 121 as an example to describe the schedulers 121, 131 and 141, the scheduler 121 includes a processor 122, memory 123 and a communication port 124. The processor 122 may be for example a general purpose processor, an application-specification integrate circuit (ASIC) or a field-programmable gate array (FPGA), etc. The processor 122 fetches and performs instructions stored in the memory 122 to determine the probability distribution of the starting time of the requesting power consuming device based on the data received or accessed from the smart meter 120 and the actual starting time based on the probability distribution of the starting time. The communication port 124 is an interface of the scheduler 121 with the smart meter 120. Data and instructions exchanged between the scheduler 121 and the smart meter 120 are communicated via the communication port 124. Although the scheduler 121 is shown in FIG. 1 as a physical device, it may also be a computer program that includes machine-readable instructions running on a programmable device such as a programmable integrated circuit, a desktop, a laptop, a handset, etc., to perform the same function.

Once the probability distribution of the starting time of the requesting power consuming device is determined, the starting time is determined by the scheduler 121 in a randomised way in accordance with the probability distribution. The start instruction is then sent to the smart meter 120 at the starting time to cause starting of the requesting power consuming device.

In another embodiment, once the scheduler 121 determines the starting time in accordance with the probability distribution of starting time, a start instruction including the starting time may be sent to the smart meter 120 before the starting time. The smart meter 120 will in turn cause the power consuming device 125 to start when the starting time arrives.

In a further embodiment, the smart meter 120 may simply forward the start instruction including the starting time to the power consuming device 125 upon receipt of the start instruction from the scheduler 121, and the power consuming device 125 may automatically starts when the starting time arrives.

Power Consuming Device

The power consuming devices 125, 126, 127, 135, 136, 137, 145, 146 and 147 are devices that can be programmed to operate with electric energy within a certain time window. The power consuming devices may comprise for example home appliances such as washing machines, dryers, dishwashers, etc. If any of the power consuming devices is programmed to operate within a certain time window, an operation request is sent from the device to the smart meter connected thereto.

Figures 3, 4:
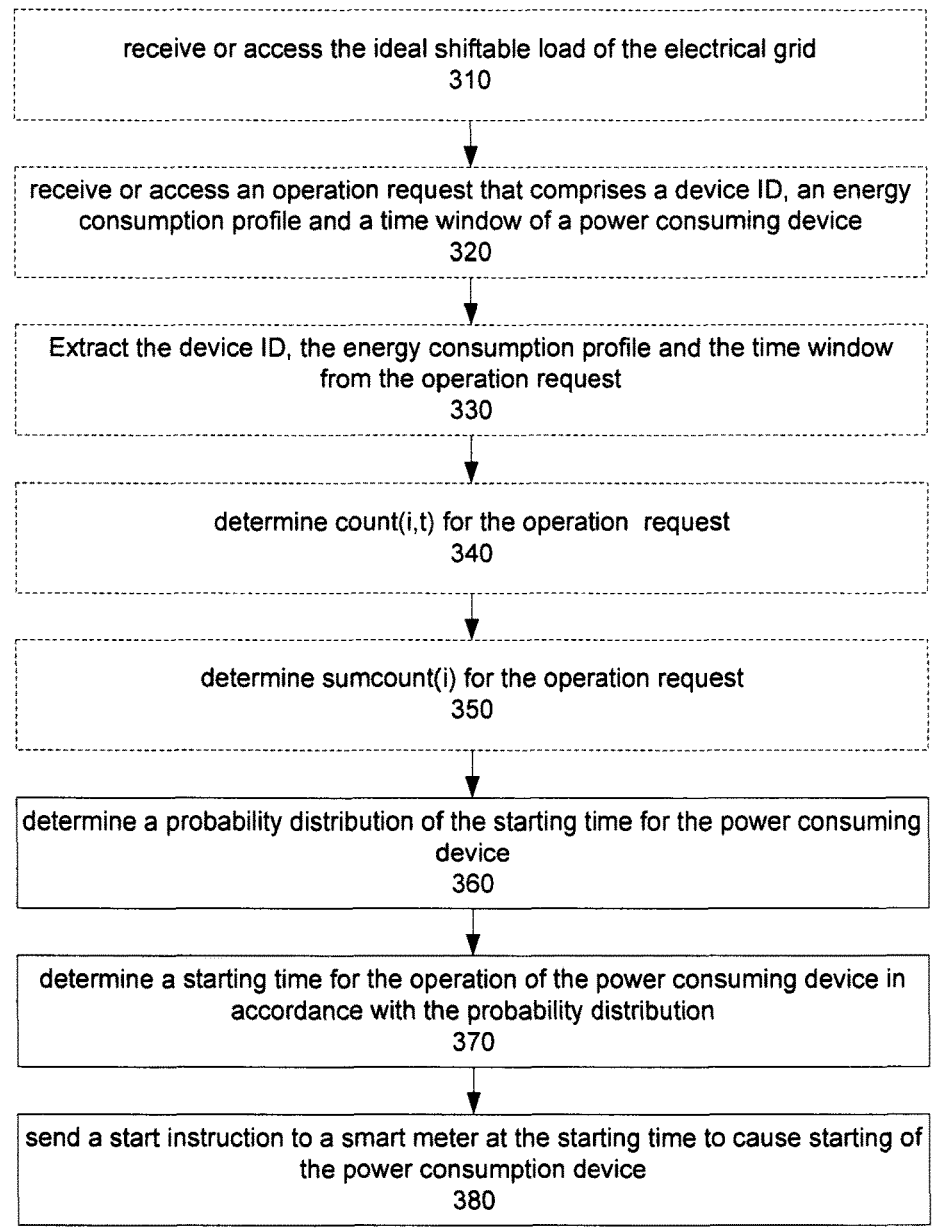
FIG. 3 is a flow chart of scheduling operation of power consuming devices according to an embodiment of the present invention.
FIG. 4 is an exemplary format of an operation request sent from a power consuming device.

The operation request may include a device ID, an energy consumption profile and a time window. An example of the operation request is shown in FIG. 4.

The device ID is used to identify the power consuming device that needs to operate, which may be a unique number or a string of characters, or a combination of numbers and characters, for example, "dishwasher 101" for a dishwasher, "dryer 102" for a dryer, "washing machine 103" for a washing machine, etc. The device ID may be assigned by the electric grid 110 or the manufacturer of the power consuming device.

The energy consumption profile is a vector representing how much energy the power consuming device is going to consume during its operation period. For example, the energy consumption profile may take the following form:

$$x_i = [x_{i1}, \ldots, x_{i\delta_i}] \quad (1)$$

The energy consumption profile $x_i$ indicates that the operation request i takes $\delta_i$ time periods, and the energy consumption in any time period of the operation period is represented by $x_{ir}$, where $1 \leq r \leq \delta_i$. For example, $x_{i1}$ indicates the energy consumption in the first time period of the operation period for the operation request i.

The time window in the operation request indicates a timeframe during which the power consuming device may start. The time window may be represented by a pair of numbers/character strings indicating the earliest starting time $e_i$ and the latest starting time $l_i$ of the power consuming device associated with the operation request i, for example [8 am, 3 pm].

A possible operation request that may be sent from the power consuming device 126 to the smart meter 120 is shown in FIG. 1, in which the device ID for the power consuming device 126 is "dishwasher 126", the energy consumption profile for the device is [2, 2, 1], and the earliest starting time and the latest starting time are 0:00 and 23:00, respectively.

The link in FIG. 1 between any two entities may be a physical link or a logical link. The link may also be one or more communication networks (not shown in FIG. 1).

Such networks may for example comprise private networks, public networks, public secured networks, wired networks, wireless networks, Local Area Networks (LANs), Wide Area Networks (WANs), and any combination of the foregoing. In particular, the foregoing networks may be coupled via the Internet (not shown in FIG. 1). The connection relationship between entities in FIG. 1 is for exemplary purpose only, and there may be other forms of connection without departing from the scope of the invention. Data and instructions sent over the link can be sent via any appropriate existing standard communication protocols such as TCP/IP, 3GPP, 3GPP2, etc. Alternatively, the data and instructions may also be sent via communication protocols specially designed for an electrical grid or a smart grid without departing from the scope of the invention.

Figure 5A:
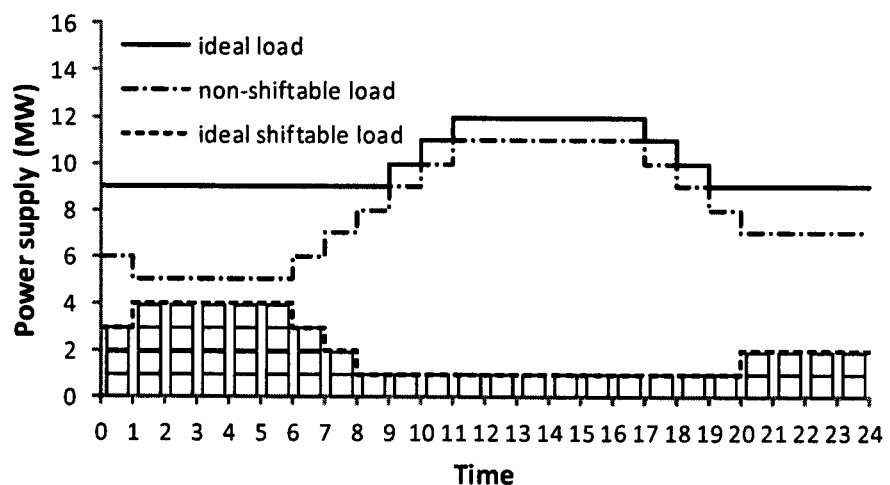
FIGS. 5a-5b show exemplary ideal shiftable load used to determine probability distribution of starting time of a power consuming device according to an embodiment of the present invention.

The process implemented by the schedulers 121, 131 and 141 to determine the probability distribution of the starting time of a power consuming device is now described with reference to FIG. 3 and FIGS. 5a-5b.

In an embodiment of the invention, the ideal shiftable load, as part of the status information of the electrical grid 110, is sent from the electrical grid 110 or other entities (not shown in FIG. 1) that have such information to the smart meters 120, 130 and 140 over the links therebetween. Alternatively, the smart meters 120, 130 and 140 may access the ideal shiftable load at the electrical grid 110 or the other entities. In another embodiment, the smart meters 120, 130 and 140 do not necessarily need to obtain the ideal shiftable load of the electrical grid 110 directly; instead, they may obtain the ideal load and the non-shiftable load of the electrical grid 110 and then determine the ideal shiftable load by subtracting the non-shiftable load from the ideal load. A person skilled in the art will appreciate that there are yet further ways to determine and obtain the ideal shiftable load at the smart meters 120, 130 and 140 without departing from the scope of the invention.

Once the ideal shiftable load of the electrical grid 110 is available at the smart meters 120, 130 and 140, they send the ideal shiftable load to their associated schedulers 121, 131 and 141, respectively; alternatively, the schedulers 121, 131 and 141 may access the ideal shiftable load from the smart meters 120, 130 and 140, as shown at step 310 of FIG. 3. In both scenarios, the scheduler 121, 131 and 141 obtain the ideal shiftable load through their communication ports 124, 134 and 144, respectively. A person skilled in the art will appreciate that there are yet further ways to obtain the ideal shiftable load at the scheduler 121, 131 and 141 without departing from the scope of the invention. Exemplary diagrams of ideal shiftable load obtained by the schedulers 121, 131 and 141 are shown in FIGS. 5a and 5b.

As described above, if a power consuming device, for example the power consuming device 126, is programmed to operate within a certain time window, an operation request is then sent to the associated smart meter, which is the smart meter 120 if the requesting power consuming device is the power consuming device 126. For example, a user decides to wash his dishes using his dishwasher 126 between 0:00 and 23:00 and is expected to take three time periods, where each time period is say one hour. If the energy consumption profile of the dishwasher for this task is [2, 2, 1], then an operation request A as shown in FIG. 1 is generated by the dishwasher 126 and sent to the smart meter 120. Upon receipt of the operation request A at the smart meter 120, the smart meter 120 sends the operation request A to the associated scheduler 121 and the scheduler 121 receives the operation request A through its communication port 124; alternatively, the scheduler 121 may access the operation request A from the smart meter 120 through the communication port 124, as shown at step 320 of FIG. 3.

Next, the scheduler 121 extracts 330 the device ID, the energy consumption profile and the time window from the operation request A.

In the present invention, the shiftable, non-shiftable, and load for the electrical grid 110 in time period t are defined as $s_t$, $n_t$ and $d_t$, respectively. And the ideal shiftable load and ideal load for the electrical grid 110 in time period t are defined as $s_t^*$ and $d_t^*$. Hence, as described above and shown in FIGS. 2a-2b and FIGS. 5a-5b, for each time period t the load is the sum of the shiftable load and non-shiftable load $d_t = s_t + n_t$ and the ideal shiftable load is the ideal load minus the non-shiftable load $s_t^* = d_t^* - n_t$.

The probability distribution of the starting time of the requesting power consuming device for the operation request i is defined as $$P_{it} = \begin{cases} \frac{count(i, t)}{sumcount(i)} & \text{if } e_i \leq t \leq l_i \\ 0 & \text{otherwise} \end{cases} \quad (2)$$

Wherein, count(i,t) represents how many hypothetical requests with the same energy consumption profile as the operation request i can be scheduled to start in time period t in order to achieve the ideal shiftable load $s_t^*$. Therefore, in this example of the present invention, count(i,t) is defined as follows:

$$count(i, t) = \min_{1 \leq \tau \leq \delta_i} \left\{ \frac{s_{t+\tau-1}^*}{x_{i\tau}} \right\} \quad (3)$$

sumcount(i) represents how many such operation requests can be scheduled over the given time window. Hence, sumcount(i) is simply the sum of count(i,t) over all time periods $e_i \leq t \leq l_i$, $$sumcount(i) = \Sigma_{e_i \leq t \leq l_i} count(i,t) \quad (4)$$

It should be noted that there are different other ways to define count(i,t) and sumcount(i) without departing from the scope of the invention.

At step 340 of FIG. 3, given that the ideal shiftable load of the electrical grid 110 is shown as FIG. 5a, then count (A,t) is determined as follows in accordance with equation (3):

$$\text{count}(A, 0) = \min_{1 \leq \tau \leq 3} \left\{ \frac{s^*_{\tau-1}}{x_{A\tau}} \right\} = \min\{1.5, 2, 4\} = 1.5$$

$$\text{count}(A, 1) = \min_{1 \leq \tau \leq 3} \left\{ \frac{s^*_{\tau}}{x_{A\tau}} \right\} = \min\{2, 2, 4\} = 2$$

$$\text{count}(A, 2) = \min_{1 \leq \tau \leq 3} \left\{ \frac{s^*_{\tau+1}}{x_{A\tau}} \right\} = \min\{2, 2, 4\} = 2$$

$$\text{count}(A, 3) = \min_{1 \leq \tau \leq 3} \left\{ \frac{s^*_{\tau+2}}{x_{A\tau}} \right\} = \min\{2, 2, 4\} = 2$$

$$\text{count}(A, 4) = \min_{1 \leq \tau \leq 3} \left\{ \frac{s^*_{\tau+3}}{x_{A\tau}} \right\} = \min\{2, 2, 3\} = 2$$

$$\text{count}(A, 5) = \min_{1 \leq \tau \leq 3} \left\{ \frac{s^*_{\tau+4}}{x_{A\tau}} \right\} = \min\{2, 1.5, 2\} = 1.5$$

$$\text{count}(A, 6) = \min_{1 \leq \tau \leq 3} \left\{ \frac{s^*_{\tau+5}}{x_{A\tau}} \right\} = \min\{1.5, 1, 1\} = 1$$

$$\text{count}(A, 7) = \min_{1 \leq \tau \leq 3} \left\{ \frac{s^*_{\tau+6}}{x_{A\tau}} \right\} = \min\{1, 0.5, 1\} = 0.5$$

$$\text{count}(A, 8) = \min_{1 \leq \tau \leq 3} \left\{ \frac{s^*_{\tau+7}}{x_{A\tau}} \right\} = \min\{0.5, 0.5, 1\} = 0.5$$

... ...

$$\text{count}(A, 17) = \min_{1 \leq \tau \leq 3} \left\{ \frac{s^*_{\tau+16}}{x_{A\tau}} \right\} = \min\{0.5, 0.5, 1\} = 0.5$$

$$\text{count}(A, 18) = \min_{1 \leq \tau \leq 3} \left\{ \frac{s^*_{\tau+17}}{x_{A\tau}} \right\} = \min\{0.5, 0.5, 2\} = 0.5$$

$$\text{count}(A, 19) = \min_{1 \leq \tau \leq 3} \left\{ \frac{s^*_{\tau+18}}{x_{A\tau}} \right\} = \min\{0.5, 1, 2\} = 0.5$$

$$\text{count}(A, 20) = \min_{1 \leq \tau \leq 3} \left\{ \frac{s^*_{\tau+19}}{x_{A\tau}} \right\} = \min\{1, 1, 2\} = 1$$

$$\text{count}(A, 21) = \min_{1 \leq \tau \leq 3} \left\{ \frac{s^*_{\tau+20}}{x_{A\tau}} \right\} = \min\{1, 1, 2\} = 1$$

$$\text{count}(A, 22) = \min_{1 \leq \tau \leq 3} \left\{ \frac{s^*_{\tau+21}}{x_{A\tau}} \right\} = \min\{1, 1, 3\} = 1$$

$$\text{count}(A, 23) = \min_{1 \leq \tau \leq 3} \left\{ \frac{s^*_{\tau+22}}{x_{A\tau}} \right\} = \min\{1, 1.5, 2\} = 1$$

From the above, sumcount(A) is determined 350 by summing up count(A,t) over all time periods 0≤t≤23 in accordance with equation (4), so sumcount(A)=22.5 in this example.

Given count(A,t) and sumcount(A), it is easy to determine the probability distribution 360 of the starting time of the power consuming device 126 for the operation re question A in accordance with equation (2). For example, $P_{A,1}$=2/22.5=0.0889, $P_{A,20}$=1/22.5=0.0444, which means that the probability of starting the dishwasher 126 in the time period of 1:00-2:00 is 0.0889, and the probability of starting the dishwasher 126 in the time period of 20:00-21:00 is 0.0444, and so on. Although the probability of starting the dishwasher 126 in any time period is relatively small, the dishwasher 126 will always be started in a certain time period between 0:00 and 23:00 as the sum of $P_{A,t}$ over all time periods 0≤t≤23 is 1, which guarantees the completion of the task programmed by the user.

With the probability distribution of the starting time determined at step 360, the scheduler 121 determines a starting time 370 for the operation of the dishwasher 126 in a randomised way within the time window specified in the operation request A, say 8:00 am. Then the scheduler 121 sends 380 a start instruction to the smart meter 120 at 8:00 am through the communication port 124 to cause starting of the dishwasher 126. Once the smart meter 120 receives the start instruction from the scheduler 121, the smart meter 120 sends an instruction to the dishwasher 126 to cause the dishwasher 126 to start to perform its task.

In another embodiment, once the scheduler 121 determines the starting time of say 8:00 am in accordance with the probability distribution of starting time, a start instruction including the starting time may be sent to the smart meter 120 before 8:00 am instead of at 8:00 am. The smart meter 120 will in turn cause the dishwasher 126 to start when the starting time arrives.

In a further embodiment, the smart meter 120 may simply forward the start instruction including the starting time to the dishwasher 126 upon receipt of the start instruction from the scheduler 121, and the dishwasher 126 may automatically starts when the starting time arrives.

In this way, the schedulers 121, 131 and 141 can control in this case indirectly operation of all power consuming devices under their management. As a result, the shiftable load of the electrical grid 110 is kept substantially at the ideal shiftable load to make the electrical grid 110 operate under the optimised condition.

It should be noted that in the present invention, the schedulers 121, 131 and 141 do not directly control operation of the power consuming devices; instead, they generate the probability distribution of starting time of the power consuming devices so as to indirectly cause starting of the power consuming devices.

It will be appreciated by persons skilled in the art that numerous variations and/or modifications may be made to the invention as shown in the specific embodiments without departing from the scope of the invention as broadly described.

Figure 5B:
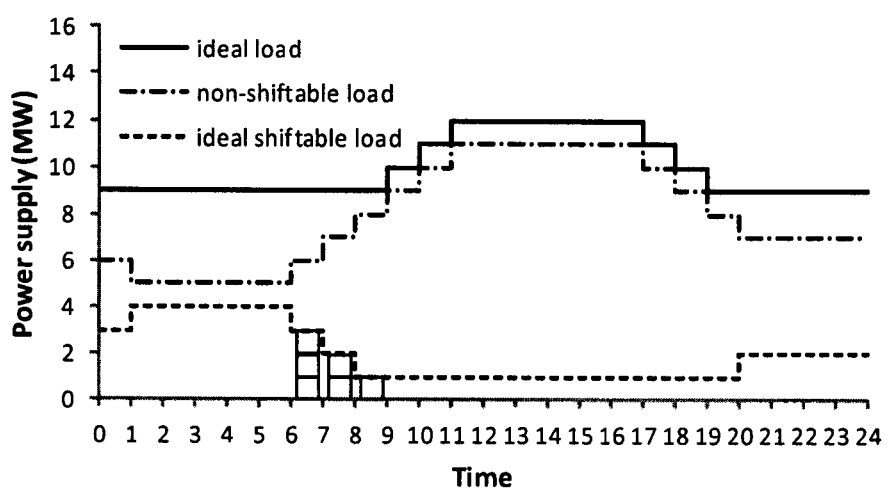

For example, the variable ideal shiftable load of the electrical grid 110 may be as shown in FIG. 5b, and the time frame can be [6, 8]. In this case, the operation request B as shown in FIG. 1 is generated by the dishwasher 126. Accordingly, count(B,t) is determined as follows in accordance with equation (3):

count(B,6)=1
count(B,7)=0.5
count(B,8)=0.5

Then sumcount(B) is 2 in this example. Given count(B,t) and sumcount(B), the probability distribution of the starting time of the dishwasher 126 for the operation request B is determined as $P_{B,6}$=½=0.5, $P_{B,7}$=0.5/2=0.25, $P_{B,8}$=0.5/2=0.25, for all other time periods the probability is zero.

For example, an alternative way to calculate count(i,t) is to curve-fit the ideal shiftable load by using only energy consumption profile of request i. The number of energy consumption profiles needed would then correspond to the number of hypothetical requests that can be scheduled to start in time period t in order to achieve the ideal shiftable load, which is count(i,t). To curve-fit the ideal shiftable load with energy consumption profile of request i, an optimization problem needs to be solved with a view to minimising the squared deviation between the ideal shiftable load and the hypothetical load that is achieved from aggregating these energy consumption profiles.

It should also be noted that the function described with respect to the scheduler 121 is not intended to be limited at the scheduler, which may be distributed among multiple entities. For example, the function of the scheduler 121 may be distributed between the scheduler 121 and the smart meter 120 or EMS (not shown in FIG. 1) without departing from the scope of the invention. Alternatively, the function of the scheduler 121 may be integrated into the smart meter 120 or EMS (not shown in FIG. 1). Even further, the function of the scheduler 121 may be distributed between multiple schedulers or centralised with the function of other schedulers.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "controlling" or "scheduling" or "obtaining" or "calculating" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A computer-implemented method for controlling operation of a power consuming device in an electrical grid, the method comprising:
   determining a probability distribution of starting time of the power consuming device based on an ideal shiftable load of the electrical grid,
   wherein a shiftable load represents energy that can be shifted from a time period into another time period,
   wherein the ideal shiftable load represents energy of the shiftable load that can be shifted to keep the electrical grid operating at an ideal load level,
   wherein the ideal load level is energy that can be supplied with the electrical grid in a time period while keeping the electrical grid within optimised operation conditions;
   determining a starting time for the operation of the power consuming device in accordance with the probability distribution of starting time; and
   causing the power consuming device to be started at the starting time.

2. The computer-implemented method according to claim 1, wherein the ideal shiftable load is based on an ideal load and a non-shiftable load of the electrical grid.

3. The computer-implemented method according to claim 1, the ideal load is variable.

4. The computer-implemented method according to claim 1, wherein determining the probability distribution of starting time of the power consuming device is based on a time window for the operation of the power consuming device.

5. The computer-implemented method according to claim 1, determining the probability distribution of starting time of the power consuming device further comprises determining the probability distribution based on an energy consumption profile and a time window for the operation of the power consuming device.

6. The computer-implemented method according to claim 1, wherein sending the instruction to cause the power consuming device to be started comprises sending, at the starting time, the instruction to start the power consuming device.

7. The computer-implemented method according to claim 1, wherein sending the instruction to cause the power consuming device to be started comprises sending, before the starting time, the instruction to an intermediary smart meter or an Energy Management System in the electric grid, wherein the instruction includes the starting time.

8. The computer-implemented method according to claim 1, the method comprising receiving or accessing an ideal shiftable load of the electrical grid.

9. A non-transitory computer readable medium that includes instructions, when executed by a processor, causes the processor to perform the method of claim 1.

10. The computer-implemented method according to claim 4, wherein the starting time is within the time window.

11. A computer system for controlling operation of a power consuming device in an electrical grid, the system comprising a processor that is adapted to:
   determine a probability distribution of starting time of the power consuming device based on an ideal shiftable load of the electrical grid,
   wherein a shiftable load represents energy that can be shifted from a time period into another time period,
   wherein the ideal shiftable load represents energy of the shiftable load that can be shifted to keep the electrical grid operating at an ideal load level,
   wherein the ideal load level is energy that can be supplied with the electrical grid in a time period while keeping the electrical grid within optimised operation conditions;
   determine a starting time for the operation of the power consuming device in accordance with the probability distribution of starting time; and
   cause the power consuming device to be started at the starting time.

12. A power consuming device for use in an electrical grid, comprising a scheduler to control operation of the power consuming device, the scheduler is configured to
   determine a probability distribution of starting time of the power consuming device based on an ideal shiftable load of the electrical grid,
   wherein a shiftable load represents energy that can be shifted from a time period into another time period,
   wherein the ideal shiftable load represents energy of the shiftable load that can be shifted to keep the electrical grid operating at an ideal load level,
   wherein the ideal load level is energy that can be supplied with the electrical grid in a time period while keeping the electrical grid within optimised operation conditions;
   determine a starting time for the operation of the power consuming device in accordance with the probability distribution of starting time; and
   cause the power consuming device to be started at the starting time.

13. The power consuming device according to claim 12, wherein the scheduler is further configured to
   determine the probability distribution of starting time of the power consuming device based on a time window for the operation of the power consuming device.

14. The power consuming device according to claim 13, wherein the starting time is within the time window.

* * * * *